United States Patent
Shivarudraiah et al.

(10) Patent No.: US 9,600,546 B2
(45) Date of Patent: Mar. 21, 2017

(54) SYSTEM AND METHOD FOR MARSHALING MASSIVE DATABASE DATA FROM NATIVE LAYER TO JAVA USING LINEAR ARRAY

(71) Applicant: ORACLE INTERNATIONAL CORPORATION, Redwood Shores, CA (US)

(72) Inventors: Ashok Shivarudraiah, Fremont, CA (US); Edward Shirk, Berkeley, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 312 days.

(21) Appl. No.: 14/251,410

(22) Filed: Apr. 11, 2014

(65) Prior Publication Data

US 2014/0379739 A1 Dec. 25, 2014

Related U.S. Application Data

(60) Provisional application No. 61/838,802, filed on Jun. 24, 2013.

(51) Int. Cl.
*G06F 17/30* (2006.01)
(52) U.S. Cl.
CPC ................ *G06F 17/3056* (2013.01)
(58) Field of Classification Search
CPC combination set(s) only.
See application file for complete search history.

(56) References Cited

U.S. PATENT DOCUMENTS

| 6,338,089 | B1 | 1/2002 | Quinlan |
| 7,174,539 | B2 * | 2/2007 | Dresselhaus ......... G06F 9/4425 712/E9.082 |
| 7,257,625 | B2 | 8/2007 | Wu |
| 7,978,544 | B2 | 7/2011 | Bernard |
| 9,229,993 | B2 | 1/2016 | Odenheimer |
| 2004/0088413 | A1 | 5/2004 | Bhogi |

(Continued)

FOREIGN PATENT DOCUMENTS

| WO | 2006073865 | 7/2006 |
| WO | 2012037163 | 3/2012 |

OTHER PUBLICATIONS

DBA Administrators, "What is the difference between a connection and a session and how are they related?", 2 pages, retrieved Mar. 23, 2016 from: <http://dba.stackexchange.com/questions/13698/what-is-the-difference-between-a-connection-and-a-session>.

(Continued)

*Primary Examiner* — Shyue Jiunn Hwa
(74) *Attorney, Agent, or Firm* — Tucker Ellis LLP

(57) ABSTRACT

A system and method for marshaling database data from a native interface layer, to a Java layer, using a linear array. In accordance with an embodiment, a request is received from a software application to query or access data stored at the database. At a database driver native interface layer, the system obtains cell data from the database, determines cell coordinates and a cell metadata, and linearizes the cell data if required. The linearized data is then flushed to a linear byte array in the database driver presentation layer, and the cell coordinates and cell metadata are provided for use by a compact data handler and the application in accessing the data.

18 Claims, 6 Drawing Sheets

(56) References Cited

U.S. PATENT DOCUMENTS

| | | | |
|---|---|---|---|
| 2004/0098731 A1* | 5/2004 | Demsey | G06F 9/542 |
| | | | 719/328 |
| 2005/0015411 A1 | 1/2005 | Altman | |
| 2005/0028164 A1 | 2/2005 | Neuwald | |
| 2005/0038801 A1 | 2/2005 | Colrain | |
| 2006/0143187 A1 | 6/2006 | Mukkamalla | |
| 2006/0143396 A1 | 6/2006 | Cabot | |
| 2006/0146878 A1 | 7/2006 | Srivastava | |
| 2007/0136311 A1* | 6/2007 | Kasten | H04L 67/1008 |
| 2008/0052370 A1 | 2/2008 | Snyder | |
| 2009/0064199 A1 | 3/2009 | Bidelis et al. | |
| 2009/0094589 A1 | 4/2009 | Gupta | |
| 2009/0282369 A1 | 11/2009 | Jones | |
| 2011/0154329 A1 | 6/2011 | Arcese | |
| 2011/0218981 A1 | 9/2011 | Retnakumari | |
| 2012/0066363 A1 | 3/2012 | Somogyi | |
| 2012/0136602 A1 | 5/2012 | Hossain | |
| 2012/0233407 A1 | 9/2012 | Choi | |
| 2013/0091153 A1 | 4/2013 | Gitelman | |
| 2013/0144984 A1 | 6/2013 | Zhao | |
| 2014/0129592 A1 | 5/2014 | Samudrala | |

OTHER PUBLICATIONS

Anonymous, Database Connection Pool Management, Research Disclosure, Dec. 1, 1998, 3 pages, vol. 41, No. 416, Mason Publications, Hampshire, GB.

International Searching Authority at the European Patent Office, International Search Report and Written Opinion for PCT International Patent Application No. PCT/US2014/035187, Aug. 5, 2014, 11 pages.

United States Patent and Trademark Office, Office Action Dated Jul. 29, 2016 for U.S. Appl. No. 14/202,348, 15 Pages.

United States Patent and Trademark Office, Office Action Dated May 17, 2016 for U.S. Appl. No. 14/253,580, 12 Pages.

* cited by examiner

SYSTEM AND METHOD FOR MARSHALING MASSIVE DATABASE DATA FROM NATIVE LAYER TO JAVA USING LINEAR ARRAY

CLAIM OF PRIORITY

This application claims the benefit of priority to U.S. Provisional Patent Application titled "SYSTEM AND METHOD FOR MARSHALING MASSIVE DATABASE DATA FROM NATIVE LAYER TO JAVA USING LINEAR ARRAY", Application Ser. No. 61/838,802, filed Jun. 24, 2013, which application is incorporated herein by reference.

CROSS-REFERENCE TO RELATED APPLICATIONS

This application is related to the following U.S. Patent Applications, each of which applications is incorporated herein by reference: U.S. Patent Application titled "SYSTEM AND METHOD FOR CONNECTION LABELING FOR USE WITH CONNECTION POOLS", Application Ser. No. 13/912,086, filed Jun. 6, 2013; U.S. Patent Application titled "SUPPORT FOR CLOUD-BASED MULTI-TENANT ENVIRONMENTS USING CONNECTION LABELING", Application Ser. No. 13/912,098, filed Jun. 6, 2013; U.S. Patent Application titled "SYSTEM AND METHOD FOR PROVIDING A SECOND LEVEL CONNECTION CACHE FOR USE WITH A DATABASE ENVIRONMENT", Application Ser. No. 14/253,580 filed, Apr. 15, 2014, U.S. Patent Application titled "SYSTEM AND METHOD FOR PROVIDING A SHARABLE GLOBAL CACHE FOR USE WITH A DATABASE ENVIRONMENT", Application Ser. No. 14/253,573 filed Apr. 15, 2014, U.S. Patent Application titled "EFFICIENT STORAGE AND RETRIEVAL OF FRAGMENTED DATA USING PSEUDO LINEAR DYNAMIC BYTE ARRAY", Application Ser. No. 14/259,499 filed Apr.23, 2014, U.S. Patent Application titled "SYSTEM AND METHOD FOR TRANSPARENT MULTI KEY-VALUE WEIGHTED ATTRIBUTED CONNECTION USING UNI-TAG CONNECTION POOLS", Application Ser. No. 14/202,348, filed Mar. 10, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and databases, and are particularly related to a system and method for marshaling database data from a native interface layer to a Java layer using a linear array.

BACKGROUND

In an application server or database environment which enables access by software applications to data in a database, typically the data retrieved from the database must be allocated in memory arrays or buffers before it can be accessed by the requesting application. Generally, whenever an application makes a request to the database, the database driver (e.g., Java Database Connectivity, JDBC driver) first receives the required data into a native interface (e.g., Java Native Interface, JNI) layer, and then provides that data to a presentation (e.g., Java) layer, where it can be accessed by the application.

However, in some environments, the arrays or buffers allocated in memory for use with the data can be very large, and can include unused or empty space. Additionally, copying of data between the layers can be computationally expensive.

SUMMARY

In accordance with an embodiment, described herein is a system and method for marshaling database data from a native interface layer, to a Java layer, using a linear array. In accordance with an embodiment, a request is received from a software application to query or access data stored at the database. At a database driver native interface layer, the system obtains cell data from the database, determines cell coordinates and a cell metadata, and linearizes the cell data if required. The linearized data is then flushed to a linear byte array in the database driver presentation layer, and the cell coordinates and cell metadata are provided for use by a compact data handler and the application in accessing the data.

DETAILED DESCRIPTION

As described above, in an application server or database environment which enables access by software applications to data in a database, typically the data retrieved from the database must be allocated in memory arrays or buffers before it can be accessed by the requesting application. However, in some environments, the arrays or buffers allocated in memory for use with the data can be very large, and can include unused or empty space. Additionally, copying of data between the layers can be computationally expensive.

In accordance with an embodiment, described herein is a system and method for marshaling database data from a native interface layer, to a Java layer, using a linear array. In accordance with an embodiment, a request is received from a software application to query or access data stored at the database. At a database driver native interface layer, the system obtains cell data from the database, determines cell coordinates and a cell metadata, and linearizes the cell data if required. The linearized data is then flushed to a linear byte array in the database driver presentation layer, and the cell coordinates and cell metadata are provided for use by a compact data handler and the application in accessing the data.

In accordance with an embodiment, the required data can be compacted prior to flushing it to the Java layer, which allows the system to be particularly useful for marshaling massive sets of database data received from the database. For example, in accordance with an embodiment, the cell data obtained is the actual data of the cell, without empty space or holes, instead of data of a maximum anticipated size, which has the effect of compacting the required data prior to storage in the linear byte array in the presentation layer. The above approach results in less trashing at the Java Native Interface (JNI) layer and the virtual machine, and less possibility of out-of-memory problems.

Figure 1:
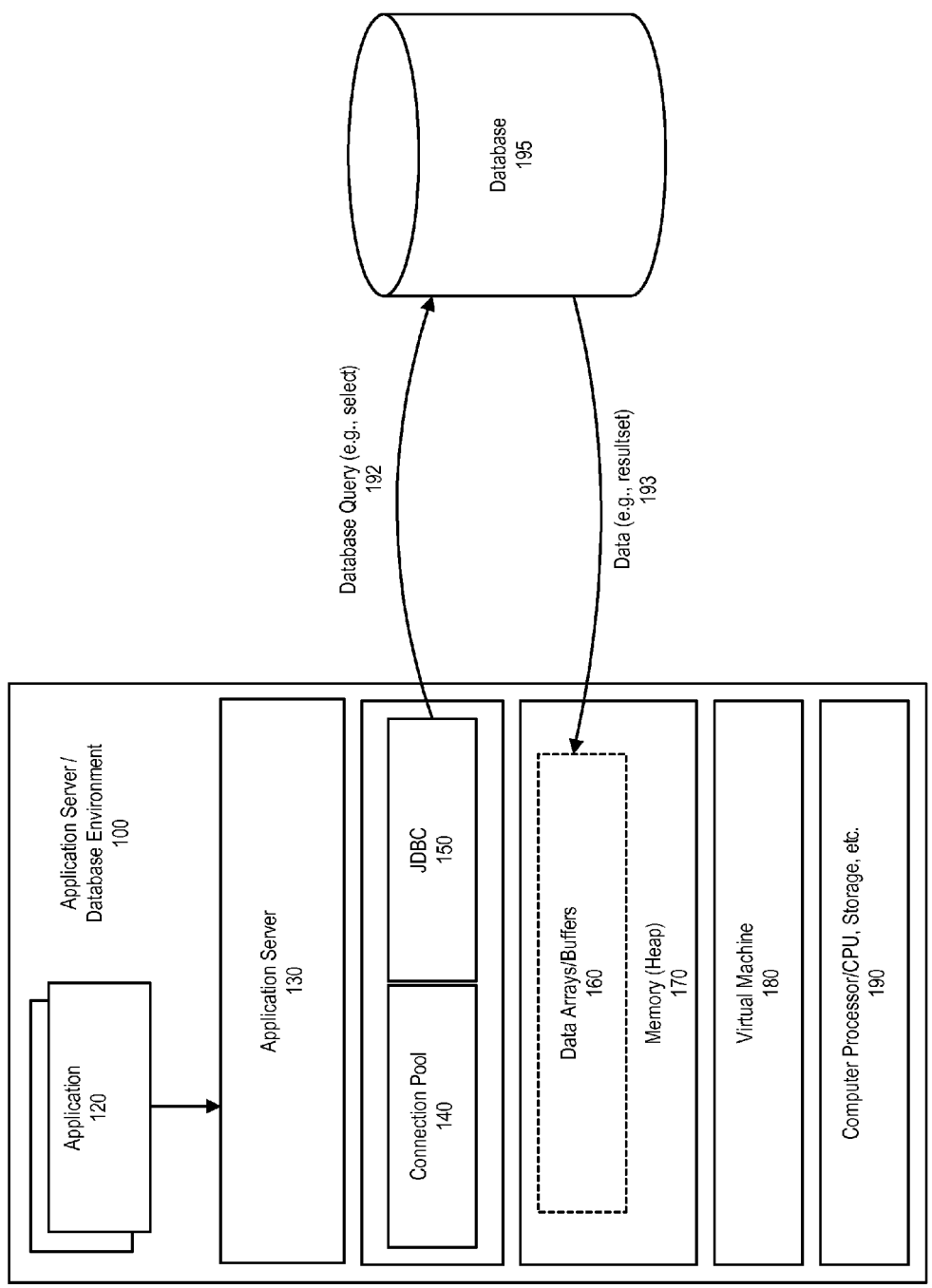
FIG. 1 illustrates a system that can utilize marshaling of database data from a native interface layer to Java, using a linear array, in accordance with an embodiment.

FIG. 1 illustrates a system that can utilize a linear byte array for marshalling massive database data from a native layer to a presentation layer, in accordance with an embodiment.

As shown in FIG. 1, by way of example, an application server or database environment 100, such as an Oracle Fusion Applications environment), can include or provide access to a database 195. As further shown in FIG. 1, the system also includes a physical computer processor/CPU and storage 190; a virtual machine (e.g., a Java virtual machine) 180; a memory/heap 170; and an application server 130 that enables access by software applications, using a connection pool (e.g., Oracle UCP) 140 and a database driver (e.g., a JAVA Database Connectivity (JDBC) driver) 150, to access or update data in the database.

Depending on the particular embodiment, software applications 120 can be provided internally within the application server itself and located at the same computer, or alternatively can be provided at other locations and act as clients to the application server. The database can be similarly located at the same computer as the application server and/or its applications, or can be provided at other computers in communication via a network.

In accordance with an embodiment, the application server or database environment can also be provided within a cloud environment, and can enable access to the database by multi-user or multi-tenant cloud-based applications.

In accordance with an embodiment, software applications can make requests, such as a database query (e.g., a select) 192, which is communicated to the database. In response, a data is returned (e.g., as a resultset 193) to the application server environment, and is stored in memory as one or more data arrays or buffers 160, for use in responding to the application's request.

Generally, whenever an application makes a request to the database, the database driver (e.g., the JDBC driver) must request the virtual machine to allocate sufficient space within the memory/heap to store the required data, so that it can be then used to satisfy the application's request. However, in some environments, the arrays or buffers allocated in memory for use with the data can be very large, and can include unused or empty space.

Figure 2:
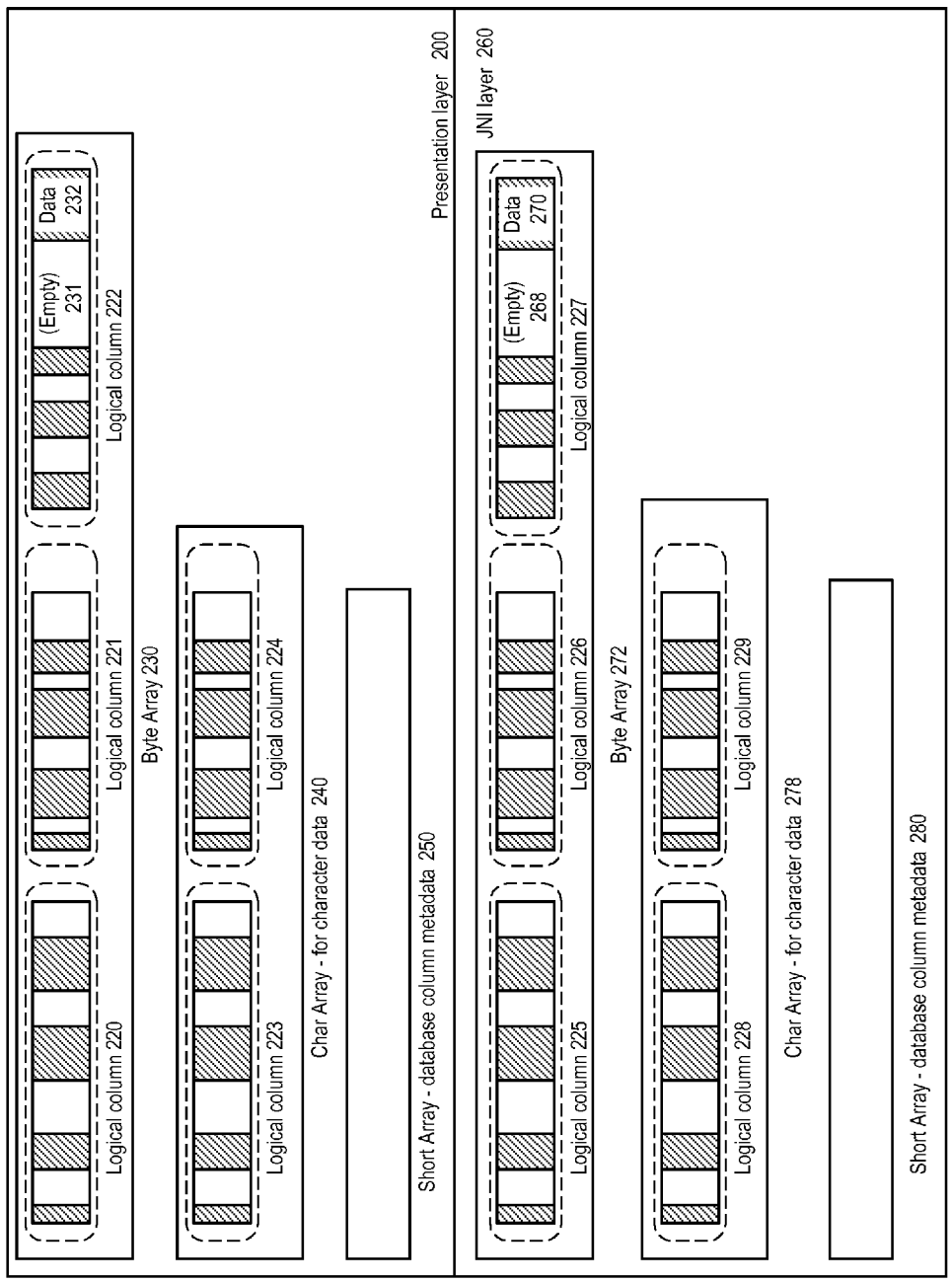
FIG. 2 illustrates moving of data from a native interface layer to Java using a traditional approach.

FIG. 2 illustrates moving of data from a native interface layer to Java using a traditional approach, in accordance with embodiment.

As shown in FIG. 2, with the traditional approach, the required data is allocated as a plurality of discrete arrays, for example in this illustration as a plurality of short 250, 280, char 240, 278, and/or byte arrays 230, 272, in both the JNI or native layer 260 and the presentation or Java layer 200. Each of the plurality of arrays may include a plurality of logical columns 220 through 229, and each logical column may include data 232, 270 and empty space 231, 268.

A problem with this approach is that these short, char, and/or byte arrays are typically allocated by the system to accommodate a maximum anticipated size (max_size) of the data that is expected to be received from the database into that array.

For example, a particular application may specify that a char array be allocated as a char[2000] array, and the system will accordingly allocate an array of this size. However, the data that is actually received from the database may be much smaller, and may not require such amount of storage. As such, the traditional approach can result in a large number of holes or empty space between fragmented data stored within the arrays.

Additionally, with the traditional approach, since each of the distinct short, char, or byte arrays must be copied from the native interface layer to the Java layer, so that they can be subsequently accessed by the requesting application, there is a large amount of data transfer across the layer boundary. The buffers allocated to the arrays are also specific to particular request statements, and cannot be shared by different statements within a database connection.

The above problems are particularly noticeable when the system is used with massive sets of database data, for example with resultsets that reflect tens or hundreds of database columns. Since a database client may know only about the maximum anticipated size (e.g., as defined by max-size), a much larger amount of memory space may be allocated than is actually needed to store a particular data. Additionally, to avoid roundtrips, the database may fetch multiple rows at a time, such that there may be many holes in the allocated arrays of data, both within the native interface layer and also when those arrays are copied to the Java layer.

Linearizer and Linearized Data

Figure 3:
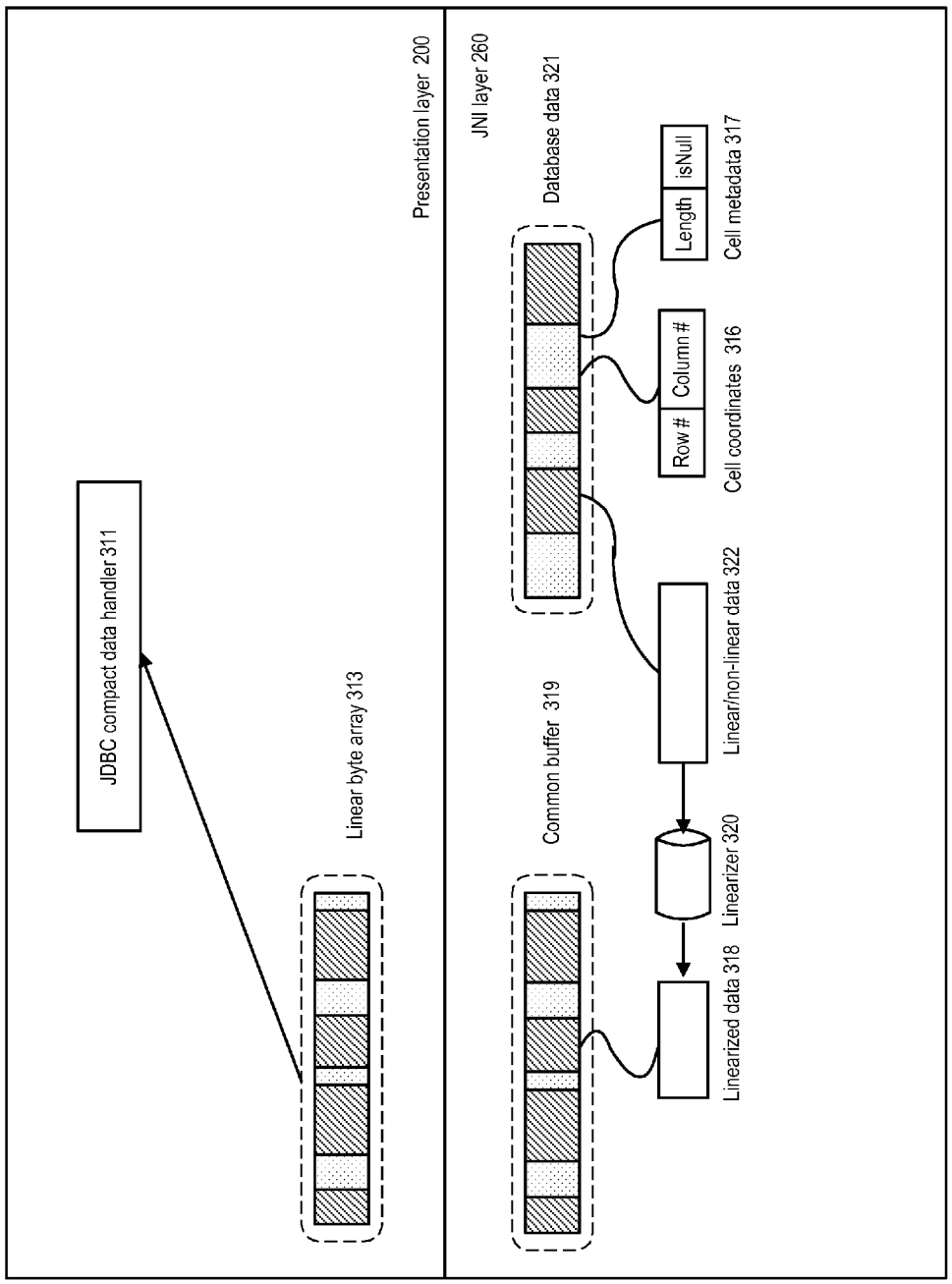
FIG. 3 illustrates marshaling of database data from a native interface layer to Java, using a linear array, in accordance with an embodiment.

FIG. 3 illustrates marshaling of database data from a native interface layer to Java, using a linear array, in accordance with an embodiment.

As shown in FIG. 3, in accordance with an embodiment, when a request is received from a software application to query or access data stored at the database, at a database driver native interface (JNI) 260 layer, the system obtains cell data from the database, determines cell coordinates 316 and a cell metadata 317, and linearizes the cell data if required. The linearized data 318 is then put into a common buffer 319 and flushed to a linear byte array 313 in the database driver presentation layer 200, and the cell coordinates and cell metadata are also provided for use by a JDBC compact data handler 311 and the application in accessing the data.

In accordance with an embodiment, unlike the traditional approach illustrated in FIG. 2, where the data obtained from the database is copied all at once in one or more arrays from the JNI layer to the presentation layer, using the above technique the system can obtain data one cell at a time from the database.

In accordance with an embodiment, when a request received from a software application is processed against the database, data is returned to the database driver from the database, so that the system can examine one cell of the data 321 at a time, and process the cell data instead of copying the data as one huge array to the presentation layer.

In accordance with an embodiment, the data returned to the database driver in response to a query request from a software application can be in its native format (e.g., a linear, or non-linear format). Non-linear data may include data with pointers, pointers to pointers, ADT (Abstract Data Types) and PL/SQL data types, which the presentation layer typically does not know how to process. In accordance with an embodiment, the linear and non-linear data can be provided to a linearizer 320, which can linearize the data if required. In accordance with an embodiment, linearizing the data can include modifying and streamlining the data types and data structures compatible with the JNI layer, into formats that the presentation layer can understand, so as to be able to reconstruct the complex data types and data structures.

In accordance with an embodiment, each cell data is associated with cell coordinates and a cell metadata, which describe the data within the cell. For example, the cell coordinates and cell metadata can provide a means of identifying the cell, and can include information such as data type, coordinates of the row and column of the cell, size, and whether the cell is NULL or size zero.

Some advantages of this approach include that the actual data, without empty space or holes, can be copied from the native interface layer to the Java layer, which has the effect of compacting the required data prior to storage in the linear byte array.

Additionally, while the traditional approach requires that each, e.g., char, byte or short array, is tied to a particular statement, in accordance with an embodiment, the use of generic buffers allows the data therein to be used by multiple statements within a connection.

Figure 4:
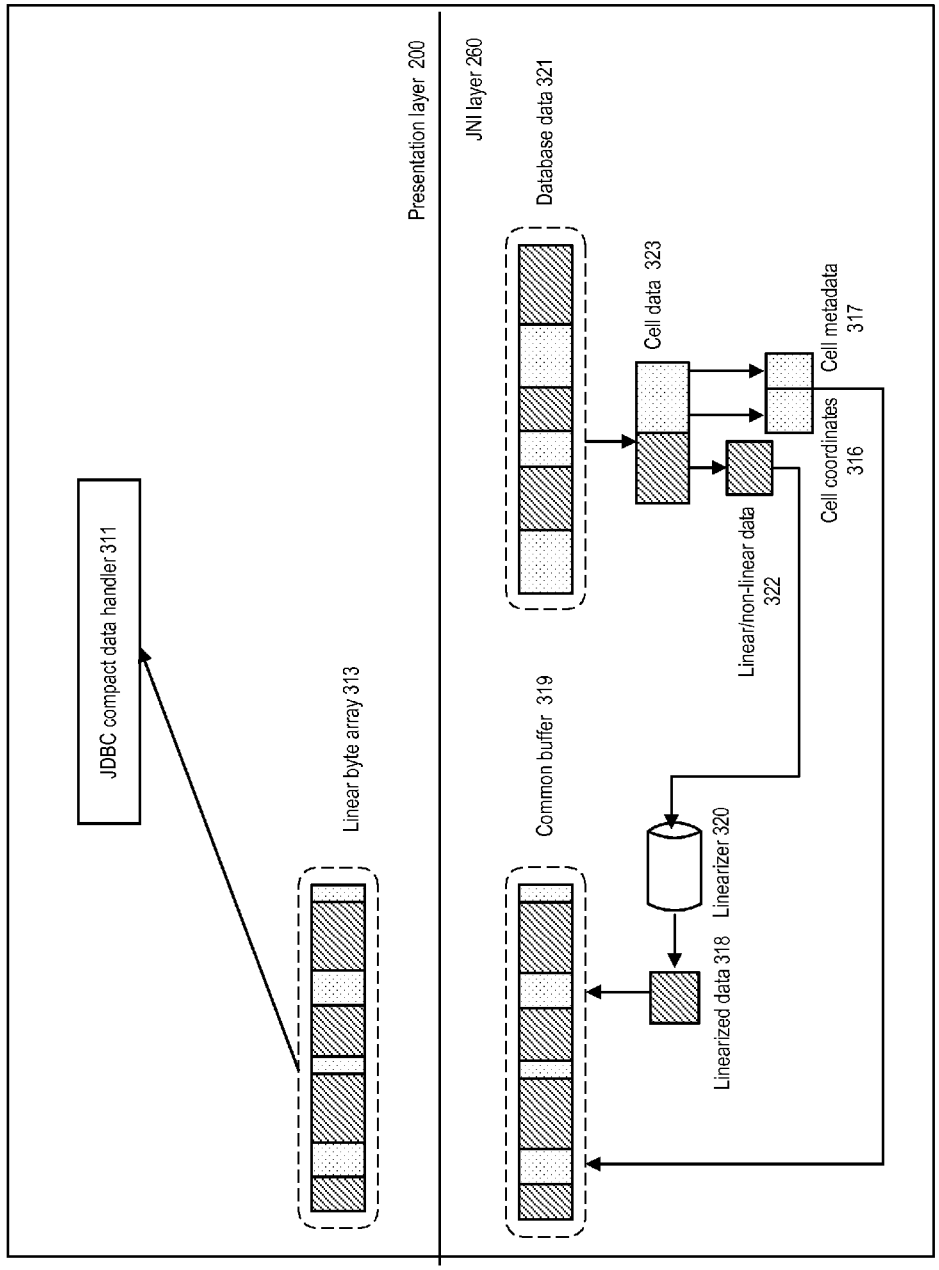
FIG. 4 further illustrates marshaling of database data from a native interface layer to Java, using a linear array, in accordance with an embodiment.

FIG. 4 further illustrates marshaling of database data from a native interface layer to Java, using a linear array, in accordance with an embodiment.

As illustrated in FIG. 4, in accordance with an embodiment, the system, in response to a request, returns data from the database to the database driver 321, and examines the data one cell at a time 323, and separates each cell of the data into a linear/non-linear data 322 within the cell, cell coordinates 316, and cell metadata 317.

In accordance with am embodiment, the linear/non-linear data can be provided to a linearizer, which can streamline the data into a format that the presentation layer can understand for reconstruction of the complicated data types and data structures.

In accordance with an embodiment, when retrieving the cell data from the database data, the system obtains the actual data of the cell, instead of data of a maximum anticipated size (e.g., max-size), which has the effect of compacting the required data prior to storage in the linear byte array in the presentation layer.

In accordance with an embodiment, the system determines whether the actual cell data will fit into the common buffer. If so, the system can copy the actual data to the common buffer; if not, the system can flush data in the buffer to the presentation layer, and then copy the actual cell data into the buffer.

In accordance with an embodiment, the separated cell coordinates and cell metadata can be provided to the common buffer, and paired with the actual data of the associated cell. The system can pair the cell coordinates and cell metadata with the actual data, so that they will be flushed to the linear byte array in the presentation layer at the same time. The compact data handler or a similar component can then interpret the cell coordinates and cell metadata and provide access by the application to the actual data within a cell.

Some database environments may allow retrieval of massive data sets from a database. In such environments, and also in complex multi-user or multi-tenant cloud-based applications, compacting provides considerable benefits. For example, by filtering the data at the native interface layer, the data can be compacted prior to communicating it from the native interface layer to the Java layer, which results in less thrashing at the JNI layer and virtual machine, and less possibility of out-of-memory problems.

Listing 1 provides an example pseudocode that illustrates how the system can marshal database data from a native interface layer to a Java layer using a linear array, in accordance with an embodiment.

As illustrated in the example shown in Listing 1, in accordance with an embodiment, the system obtains data for a cell in the database, determines cell coordinates and a cell metadata, linearizes the cell data if required, and flushes the contents of the data buffer to Java, along with the cell coordinates and cell metadata, where they can be used by a compact data handler and the application in accessing the data. In accordance with other embodiments, different and/or other steps can be used.

---

Listing 1

---

```
while(true) {
    data = getDataForOneCellFromDatabase( );
    if(EOF) break;
    linearData = linearizeIfRequired(data);
    if(bytesLeftInBuffer < linearizedLength) {
        flushCommonBufferToJava(mode, cellMetaData, commonBuffer, commonOffset);
        commonOffset = 0;
    }
    setRowColumnLengthNull(cellMetaData);
    copy(linearData,0,commonBuffer, commonOffset, linearizedLength);
    commonOffset += linearizedLength;
}
```

---

Figure 5:
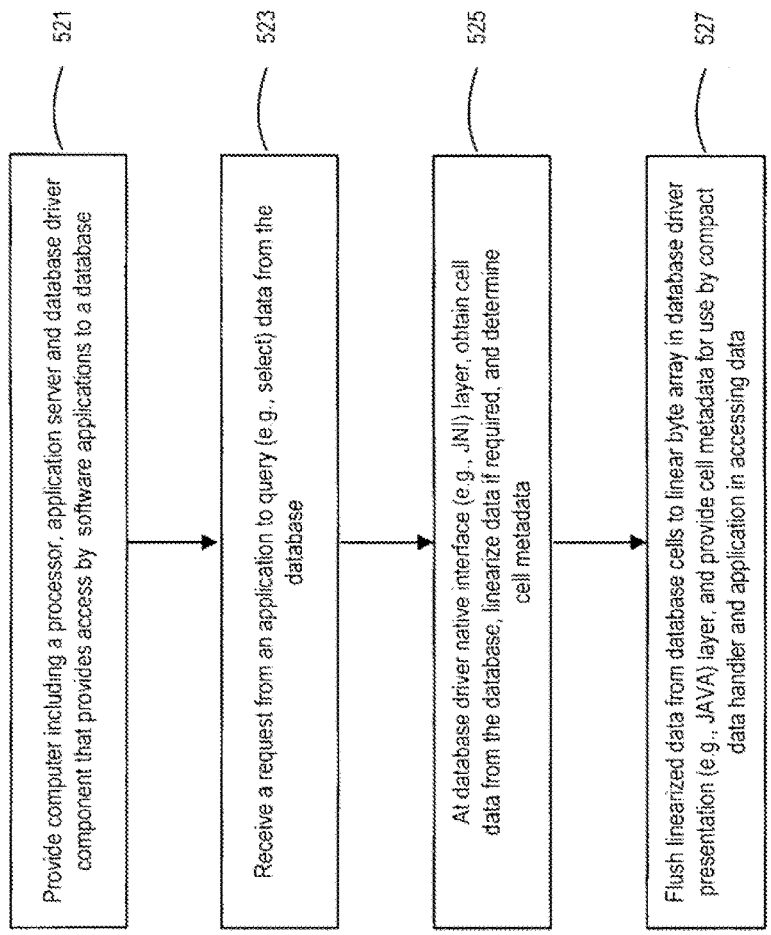
FIG. 5 is a flowchart that illustrates a method of marshaling database data from a native interface layer to Java, using a linear array, in accordance with an embodiment.

FIG. 5 is a flowchart that illustrates a method of marshaling database data from a native interface layer to Java, using a linear array, in accordance with an embodiment.

As shown in FIG. 5, in accordance with an embodiment, at a first step 521, a computer environment is provided, including a processor, application server, and a database driver that provides access by software applications to a database.

At step 523, a request is received from an application to query or access data stored at the database.

At step 525, a database driver native interface (e.g., JNI) layer, the system obtains cell data from the database, determines cell coordinates and a cell metadata, and linearizes the cell data if required.

At step 527, the linearized data is then flushed to a linear byte array in the database driver presentation (e.g., Java) layer, and the cell coordinates and cell metadata are provided for use by a compact data handler and the application in accessing the data.

Figure 6:
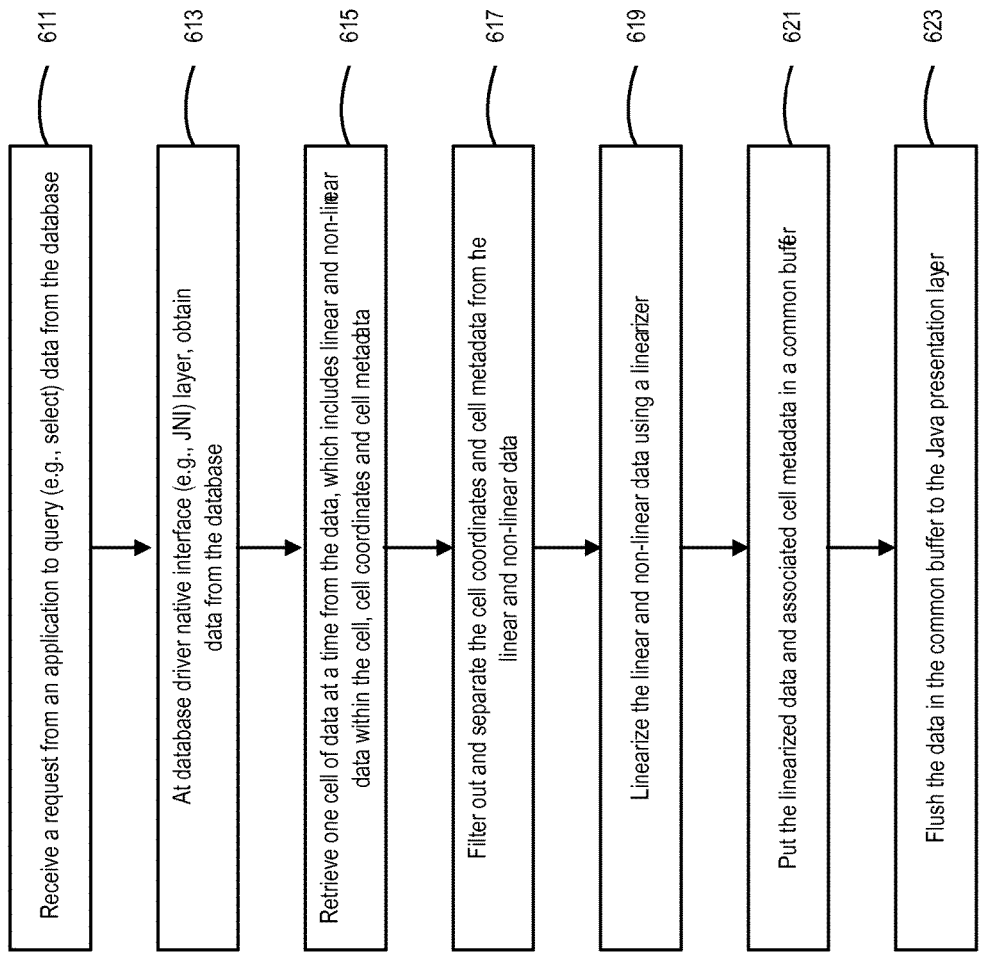
FIG. 6 is a flowchart that further illustrates a method of marshaling database data from a native interface layer to Java, using a linear array, in accordance with an embodiment.

FIG. 6 is a flowchart that further illustrates a method of marshaling database data from a native interface layer to Java, using a linear array, in accordance with an embodiment.

As shown FIG. 6, in accordance with an embodiment, at step 611, the system receives a request from an application to query (e.g., select) data from the database, and, at step 613, returns data from the database to the database driver native interface (e.g., JNI) layer in response to the request.

At step 615, the system subsequently retrieves cell data from the database one cell at a time, wherein the cell data includes a linear/non-linear data within the cell, and the associated cell coordinates and cell metadata that describe and define the cell and the data therein.

At step 617, the cell coordinates and cell metadata are then filtered out from the linear and non-linear data within the cell.

At step 619, the linear and non-linear data is subsequently provided to a linearizer that would streamline and linearize the data into a format that the presentation layer can understand so as to reconstruct the complex data structures and data objects present in the native layer. At step 621, the system provides the linearized data and the associated cell coordinates and metadata to a common buffer.

In accordance with an embodiment, at step 623, the system can determine whether the buffer has enough space for the data provided. If so, the common buffer can store the data; otherwise, it can flush the existing data therein to the presentation layer first, and then stores the data.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for marshaling database data from a native interface layer to a presentation layer using a linear array, comprising:
   a database driver executing on a processor, wherein the database driver provides access by a software application to a database, wherein the database driver includes a database driver native interface layer and a database driver presentation layer, and wherein, upon a query of the database by the software application, the database driver native interface layer operates to:
   retrieve data from a cell of the database,
   determine coordinates of the cell,
   determine metadata associated with the cell,
   linearize non-linear data included in the retrieved cell data, wherein linearizing the non-linear data includes modifying the non-linear data into a format recognized by the database driver presentation layer for reconstruction of data types and data structures present in the database driver native interface layer,
   copy the cell data to a common buffer when the cell data will fit in the common buffer along with existing data currently in the common buffer, and
   flush the existing data currently in the common buffer to a linear byte array in the presentation layer of the database driver and copy the cell data to the common buffer when the cell data will not fit in the common buffer along with the existing data currently in the common buffer; and
   provide the cell coordinates and cell metadata for use by the application in accessing the data.

2. The system of claim 1, wherein the software application is a Java application, and wherein the database driver is a Java Database Connectivity (JDBC) driver.

3. The system of claim 1, wherein the database driver native interface layer is a Java Native Interface (JNI) layer, and wherein the database driver presentation layer is a Java layer.

4. The system of claim 1, wherein the cell data is compacted prior to being flushed and stored within the linear byte array, including determining an actual size of the data within the cell, and copying only the actual data to the linear byte array.

5. The system of claim 1, wherein the cell coordinates and cell metadata are paired with the cell data, and copied to the common buffer before being flushed to the linear byte array.

6. The system of claim 1, wherein the linearized data, cell coordinates and cell metadata are flushed together to the linear byte array.

7. A method for marshaling database data from a native interface layer to a presentation layer using a linear array comprising:
   providing a database driver, wherein the database driver provides access by a software application to a database, and wherein the database driver includes a database driver native interface layer and a database driver presentation layer;
   receiving, by the database driver, a query of the database by the software application;
   retrieving, by the database driver native interface layer, data from a cell of the database;
   determining, by the database driver native interface layer, coordinates of the cell;
   determining, by the database driver native interface layer, metadata associated with the cell;
   linearizing, by the database driver native interface layer, non-linear data included in the retrieved cell data, wherein linearizing the non-linear data includes modifying the non-linear data into a format recognized by the presentation layer for reconstruction of data types and data structures present in the database driver native interface layer;
   copying, by the database driver native interface layer, the cell data to a common buffer when the cell data will fit in the common buffer along with existing data currently in the common buffer;
   flushing, by the database driver native interface layer, the existing data currently in the common buffer to a linear byte array in the presentation layer of the database driver and copy the cell data to the common buffer when the cell data will not fit in the common buffer along with the existing data currently in the common buffer; and using the cell coordinates and cell metadata by the application in accessing the data.

8. The method of claim 7, wherein the software application is a Java application, and wherein the database driver is a Java Database Connectivity (JDBC) driver.

9. The method of claim 7, wherein the database driver native interface layer is a Java Native Interface (JNI) layer, and wherein the database driver presentation layer is a Java layer.

10. The method of claim 7, wherein the cell data is compacted prior to being flushed and stored within the linear byte array, including determining an actual size of the data within the cell, and copying only the actual data to the linear byte array.

11. The method of claim 7, wherein the cell coordinates and cell metadata are paired with the cell data, and copied to the common buffer before being flushed to the linear byte array.

12. The method of claim 7, wherein the linearized data, cell coordinates and cell metadata are flushed together to the linear byte array.

13. A non-transitory computer readable storage medium, including instructions stored thereon which when read and executed by one or more computers cause the one or more computers to perform the steps comprising:

providing a database driver, wherein the database driver provides access by a software application to a database, and wherein the database driver includes a database driver native interface layer and a database driver presentation layer;

receiving, by the database driver, a query of the database by the software application;

retrieving, by the database driver native interface layer, data from a cell of the database;

determining, by the database driver native interface layer, coordinates of the cell;

determining, by the database driver native interface layer, metadata associated with the cell;

linearizing, by the database driver native interface layer, non-linear data included in the retrieved cell data, wherein linearizing the non-linear data includes modifying the non-linear data into a format recognized by the presentation layer for reconstruction of data types and data structures present in the database driver native interface layer;

copying, by the database driver native interface layer, the cell data to a common buffer when the cell data will fit in the common buffer along with existing data currently in the common buffer;

flushing, by the database driver native interface layer, the existing data currently in the common buffer to a linear byte array in the presentation layer of the database driver and copy the cell data to the common buffer when the cell data will not fit in the common buffer along with the existing data currently in the common buffer; and using the cell coordinates and cell metadata by the application in accessing the data.

14. The non-transitory computer readable storage medium of claim 13, wherein the software application is a Java application, and wherein the database driver is a Java Database Connectivity (JDBC) driver.

15. The non-transitory computer readable storage medium of claim 13, wherein the database driver native interface layer is a Java Native Interface (JNI) layer, and wherein the database driver presentation layer is a Java layer.

16. The non-transitory computer readable storage medium of claim 13, wherein the cell data is compacted prior to being flushed and stored within the linear byte array, including determining an actual size of the data within the cell, and copying only the actual data to the linear byte array.

17. The non-transitory computer readable storage medium of claim 13, wherein the cell coordinates and cell metadata are paired with the cell data, and copied to the common buffer before being flushed to the linear byte array.

18. The non-transitory computer readable storage medium of claim 13, wherein the linearized data, cell coordinates and cell metadata are flushed together to the linear byte array.

* * * * *

UNITED STATES PATENT AND TRADEMARK OFFICE
CERTIFICATE OF CORRECTION

| | | |
|---|---|---|
| PATENT NO. | : 9,600,546 B2 | |
| APPLICATION NO. | : 14/251410 | |
| DATED | : March 21, 2017 | |
| INVENTOR(S) | : Shivarudraiah et al. | |

It is certified that error appears in the above-identified patent and that said Letters Patent is hereby corrected as shown below:

In the Specification

In Column 5, Line 41, delete "am" and insert -- an --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*